United States Patent [19]

Simon et al.

[11] Patent Number: 5,736,621
[45] Date of Patent: Apr. 7, 1998

[54] PROCESS FOR THE PREPARATION OF POLYESTERS AND COPOLYESTERS, THE PRODUCTS PREPARED BY THIS PROCESS AND THEIR USE

[75] Inventors: Peter Simon, Eppstein; Andree Henze, Hofheim; Karsten Blatter, Eppstein, all of Germany

[73] Assignee: Hoechst Aktiengesellschaft, Germany

[21] Appl. No.: 670,549

[22] Filed: Jun. 27, 1996

[30] Foreign Application Priority Data

Jun. 27, 1995 [DE] Germany ................ 195 23 261.5

[51] Int. Cl.$^6$ ................................................ C08G 63/00
[52] U.S. Cl. ............... 528/271; 528/272; 264/176.1; 502/150; 502/164
[58] Field of Search .................. 264/176.1, 219; 502/150, 164; 528/271, 272

[56] References Cited

U.S. PATENT DOCUMENTS

| | | | |
|---|---|---|---|
| 3,691,123 | 9/1972 | Clarke et al. | 524/545 |
| 3,925,295 | 12/1975 | Osborn . | |
| 3,935,155 | 1/1976 | Osmond et al. | 524/504 |
| 3,985,700 | 10/1976 | Nicks et al. | 524/457 |
| 4,102,846 | 7/1978 | Bentley et al. | 524/533 |
| 4,229,339 | 10/1980 | Bentley et al. | 525/183 |
| 4,687,811 | 8/1987 | Sasaki et al. | 525/100 |
| 5,296,586 | 3/1994 | Burch et al. | 528/274 |

FOREIGN PATENT DOCUMENTS

| | | |
|---|---|---|
| 2069980 | 12/1992 | Canada . |
| 1342877 | 2/1964 | France . |
| 16 94 461 | 11/1970 | Germany . |
| 23 19 089 | 10/1973 | Germany . |
| 24 29 087 | 1/1975 | Germany . |
| 27 07 491 | 8/1977 | Germany . |
| 27 21 501 | 11/1977 | Germany . |
| 42 26 737 | 2/1994 | Germany . |
| 60-139717 | 7/1985 | Japan . |
| 60-141715 | 7/1985 | Japan . |
| 62-39621 | 2/1987 | Japan . |

*Primary Examiner*—Terressa M. Mosley
*Attorney, Agent, or Firm*—Connolly & Hutz

[57] ABSTRACT

A process is described for the preparation of polyesters by polycondensation of dicarboxylic acid-diol precondensates (oligomers) at elevated temperature in a liquid heat transfer medium in the presence of customary polycondensation catalysts and, if appropriate, cocondensable modifying agents, wherein the liquid heat transfer medium is inert and free of aromatic structural groups and has a boiling point in the range from 200° to 320° C., wherein the weight ratio of dicarboxylic acid-diol precondensate (oligomers) employed to liquid heat transfer medium is in the range from 20:80 to 80:20 and wherein the polycondensation is carried out in the reaction mixture at 200° to 320° C. in the presence of a dispersion stabilizer. Furthermore, the polyesters and copolyester which can be prepared by the process and their use are described.

44 Claims, No Drawings

PROCESS FOR THE PREPARATION OF POLYESTERS AND COPOLYESTERS, THE PRODUCTS PREPARED BY THIS PROCESS AND THEIR USE

The present invention relates to a process for the preparation of polyesters and copolyesters by polycondensation of dicarboxylic acid-diol precondensates (oligomers) at elevated temperature in a liquid heat transfer medium, in which the polycondensation is carried out in the reaction mixture at 200° to 320° C. in the presence of a dispersion stabilizer. The process allows the preparation of particularly high molecular weight products under mild reaction conditions. In particular, it also allows the preparation of those copolyesters in a very high quality which it was previously possible to obtain only with a very low molecular weight and softening point. The invention furthermore relates to the polyesters and copolyesters which can be prepared by this process and to their use.

The polyester which is industrially the most important and also most widely produced to date is polyethylene terephthalate (called PET below, as is usual). In addition, modified polyethylene terephthalates, such as, for example, products of low flammability, have also found acceptance in technology and the textile industry. The customary route for the manufacture of these polyesters comprises polycondensation in the melt or a two-stage polycondensation, the first step being carried out up to a moderate molecular weight—corresponding to an average intrinsic viscosity IV of about 0.5 to 0.7—in the melt and further condensation being carried out by condensation in the solid phase. The polycondensation is regularly carried out in the presence of known polycondensation catalysts or catalyst systems. For condensation in the solid phase, polyester chips are heated at temperatures of 180°–330° C., preferably at 220° to 240° C., under reduced pressure or under an inert gas until the desired molecular weight is reached. However, side reactions proceed in addition to the polycondensation, and some of these again lead to a degradation of the polyester chains, and some lead to the formation of decomposition products of the most diverse nature, for example colored compounds or acetaldehyde.

Polyesters from other starting materials, such as, for example, from 2,6-naphthalenedicarboxylic acid (abbreviated to PEN) and/or 4,4'-biphenyldicarboxylic acid (abbreviated to PEBB), and copolyesters of these dicarboxylic acids (abbreviated to PENBB), to which valuable use properties are attributed, have also been described in the literature.

However, industrial utilization of these polyesters is obstructed by preparation difficulties. Thus, to date, only in the case of PEN, PETBB and PENBB have these polyesters been successfully prepared with the required high molecular weight, with a high technical outlay. On the other hand, for example, high condensation of PEN or PENBB in the melt is obstructed by the very high melt viscosity of the products. These problems arise both if the preparation of the polyesters or copolyesters is to be carried out by cocondensation, where the starting compounds are first transesterified and oligomerized together in the desired mixing ratio and the product is then subjected to polycondensation, and if it is carried out by blending condensation, where mixtures of the individual oligomers are prepared and these are then subjected to polycondensation. In the case of PET/PEN, there is usually a lack of a tendency to crystallize, which means that the attempt at condensation in the solid phase to increase the molecular weight fails because of caking of the polyester chips.

There is an abundance of proposals relating to processes for the preparation of polyesters. Japanese Patent JP-A-60-139717 discloses a process for the preparation of polyalkylene terephthalate in which a suspension of finely powdered bis-(omega-hydroxyalkyl) terephthalate or oligomers thereof is heated in a liquid heat transfer medium, for example in Tetralin, in which a highly polymeric substance, for example polystyrene, is furthermore dispersed, in the presence of condensation catalysts to a temperature which is above the melting point of the highly polymeric substance, for example to 270° C., under pressure. A suspension of polyalkylene terephthalate particles having an average particle size of 185 μm is obtained in this process.

Another quite similar process for the preparation of polyalkylene terephthalate is known from Japanese Patent JP-A-60-139717. In this process, for example, benzene, methyl ethyl ketone or triphenylmethane is employed as the heat transfer medium and polystyrene, PVC, or polybutadiene is employed as the highly polymeric added substance.

DE-C-2 429 087 discloses a process for the preparation of polymers, for example of polyesters, which comprise fillers (modifying agents), for example $TiO_2$, in which the monomeric or low molecular weight starting substances, for example BHT (bis-(omega-hydroxyalkyl) terephthalate or oligomers thereof), and the fillers are polymerized in finely divided form in a liquid heat transfer medium, that is to say a hydrocarbon or chlorohydrocarbon, in the presence of specific emulsifying agents at elevated temperature. Aliphatic C6–C8 hydrocarbons, aromatic hydrocarbons, such as benzene and methylbenzenes, petroleum fractions comprising up to 90% by weight of aromatic hydrocarbons, carbon tetrachloride, polychloroethanes or mono-, di- or trichlorobenzene, which are employed in combination with polar solvents if necessary, are recommended, for example, as the hydrocarbon or chlorohydrocarbon. The specific emulsifiers are polymers which contain two different types of polymer chains, for example a block polymer of methoxypolyethylene glycol and poly-12-hydroxystearic acid modified with glycidyl methacrylate.

A quite similar process which is used for preparation of polyesters, polyamides and polyesteramides is to be found in DE-A-27 07 491. In this process, at least one of the monomeric starting substances should be insoluble in the heat transfer medium and have a melting point above the polymerization temperature. The polymerization is carried out in the presence of dispersing agents for the monomers and the resulting polymer which have a molecular chain component which can be solvated by the heat transfer medium and a molecular chain component which can be associated onto the monomer or polymer particle.

DE-A-23 19 089 discloses a similar process in which one of the reactants is solid and not completely dissolved in the heat transfer medium and the other reactants are dissolved. This reaction is also carried out in the presence of dispersing agents for the monomers and the resulting polymer which contain a molecular chain component which can be solvated by the heat transfer medium and a molecular chain component which can be associated onto the monomer or polymer particle. The process produces stable polymer dispersions. No information in respect of the molecular weights and on the acetaldehyde content are to be found in the document.

Another similar process for the preparation of dispersions of synthetic polymer particles in an organic liquid is known from DE-A-16 94 461. In this process, the condensation is carried out in a heat transfer medium in the presence of a polymeric stabilizer which contains strongly polar groups which interact strongly with polar groups of the polymer prepared, so that the stabilizer forms a steric barrier of at least 12 Å(angstroms) on the polymer particles.

Japanese Patents JP-63-41528 and JP-62-39621 disclose condensation of BHT in finely divided form in a heat transfer medium in the presence of specific dispersing agents to give PET, silicone oil being employed as the heat transfer medium. Dispersing agents which are employed are copolymers of the polysiloxane-vinyl type, for example methacryloyloxypropyl-polyethedmethylsiloxane-methyl methacrylate graft polymers or methacryloyloxypropyl-polyether-polydimethylsiloxane.

German Patents DE-A-41 17 825 and DE-A-42 26 737 disclose a process for the polycondensation of polyester precondensates in which the precondensates are subjected to polycondensation in a liquid inert heat transfer medium at a temperature below their melting point to give polyesters of high average molecular weight and narrow molecular weight distribution. Heat transfer media which are employed are silicone oils or perfluorinated organic compounds, for example perfluoro-polyethers.

Japanese Patents JP-62-39621 and J P-60-141715 disclose condensation of BHT in finely divided form in a heat transfer medium in the presence of specific dispersing agents to give PET, silicone oil being employed as the heat transfer medium. Dispersing agents which are employed are graft polymers with a polysiloxane main chain and polyacrylate side chains or an acrylate main chain and siloxane side chains, which are linked via methacryloyloxypropyl or mercapto groups.

German Patent DE-A-27 21 501 discloses a process for the preparation of condensation polymers in a liquid which does not dissolve the polymer, in which the starting monomers, at least one of which must be emulsified in the liquid, are polymerized in the presence of a reactive high molecular weight polymer. The reactive high molecular weight polymer has a simple chain having a molecular weight of 1000 to 20000 and at least one reactive group which can participate in the reaction for formation of the condensation polymer. Storage-stable or at least readily redispersible polymer dispersions are obtained. No indications of a process for the preparation of polymers of high molecular weight are to be found in the document.

U.S. Pat. No. 5,296,586 discloses a process for the preparation of polyesters in which the polycondensation is carried out in a boiling inert liquid without addition of dispersion stabilizers. This process leads to a polyester material which is in the form of lumps and includes relatively large amounts of the inert liquid.

It is known from "Polymer" 33, No. 14 (1992), pages 3066 to 3072 to prepare non-aqueous dispersions of fully aromatic liquid crystal polymers by polycondensation of the reactants, for example 4-hydroxybenzoic acid and 2-hydroxy-6-naphthoic acid, in a liquid heat transfer medium, for example in partly hydrogenated terphenyl, in the presence of polymeric dispersing agents, such as for example a copolymer of methyl methacrylate, styrene, 2-ethylhexyl acrylate and acrylic acid, and of an inorganic dispersing agent, for example hydrophobized $SiO_2$.

The processes described to date in the prior art for carrying out polycondensation reactions in liquid heat transfer media have chiefly been carried out in respect of the preparation of stable polymer dispersions or in respect of overcoming difficulties which occur in the polycondensation during the preparation of polyesters. The processes which operate with liquid heat transer media have the common advantage that the formation of high-viscosity reaction mixtures is avoided, a more homogeneous temperature distribution prevails in the batches, as a rule the low molecular weight condensation products, such as glycol and water, can also be removed from the reaction mixture more easily, and products having higher average molecular weights, i.e. a higher intrinsic viscosity (IV) can be obtained. However, the known processes are in no way universally applicable. The prior art provides no knowledge of the use of such polycondensation processes for the preparation of copolyesters which, because of a particularly high amorphous content, leads to considerable preparation and processing difficulties.

Thus, to date, no process has been described which enables, for example, copolyesters which contain 2,6-naphthalene-dicarboxylic acid structural groups in any desired mol % contents to be prepared in a simple manner with a high average molecular weight and in a non-tacky form which can readily be further processed.

Copolyesters can be prepared by conventional techniques from terephthalic acid and more than about 7 to 8 mol % of 2,6-naphthalene-dicarboxylic acid only up to an average molecular weight $M_w$ of about 15000 to 25000. Although chips can be produced from such a polyester, further processing thereof presents considerable difficulties or is impossible, because the material becomes very tacky when heated above the glass transition temperature.

The preparation of polyesters from 2,6-naphthalene-dicarboxylic acid fails, for example, because of the very high melt viscosity of the polycondensation melt. In this case, although condensation in the solid phase is possible, this requires a long reaction time, which not only makes the preparation very expensive but also promotes the progress of side reactions, i.e. the formation of by-products.

It has now been found, surprisingly, that such polyesters which cannot be obtained in the required quality by known methods can also be prepared at a relatively low polycondensation temperature in excellent purity and with very high average molecular weights $M_w$ if the polycondensation is carried out in certain non-aqueous heat transfer media, and preferably under defined reaction conditions.

The preparation of polyesters in powder form is possible with the aid of the process according to the invention. The d50 values (measure of the particle size distribution) are below 2000 μm, preferably below 1000 μm, in particular below 500 μm.

The process according to the invention is more universally applicable than processes known to date.

Essential advantages of the process according to the invention are:

- simpler construction of the apparatus, no vacuum or pressure necessary,
- inexpensive heat transfer medium,
- commercially obtainable dispersion stabilizers,
- high starting monomer concentrations possible; a monomer concentration of up to 70% by weight in the starting mixture still leads to stable polymer dispersions,
- a high molecular weight can be achieved,
- comparatively short reaction time,
- lower acetaldehyde content,
- in a preferred embodiment, additionally improved expulsion of the diol during the polycondensation, owing to a specific stirrer design (therefore further improved rate of polycondensation and suppression of side reactions), associated with a very good distribution of nitrogen in the dispersion.

The present invention thus relates to a process for the preparation of polyesters in powder form by polycondensation of dicarboxylic acid-diol precondensates (oligomers) at elevated temperature in a liquid heat transfer medium in the presence of customary polycondensation catalysts and, if appropriate, cocondensable modifying agents wherein the liquid heat transfer medium is inert and free from aromatic structural groups and has a boiling point from 200° to 320° C., preferably from 220° to 300° C., in particular from 240° to 285° C., wherein the weight ratio of oligomers employed to liquid heat transfer medium is in the range from 20:80 to 80:20, preferably in the range from 30:70 to 70:30, in particular in the range from 50:50 to 70:30, and wherein the polycondensation is carried out in the reaction mixture at 200° to 320° C. in the presence of a dispersion stabilizer.

The dicarboxylic acid-diol precondensate employed as the starting material for the process according to the invention is a reaction product of one or more dicarboxylic acids of the formula HOOC—A—COOH and, if appropriate, hydroxycarboxylic acids HO—A—COOH or functional derivatives of these di- or hydroxycarboxylic acids, with one or more diols of the formula HO—D—OH (in which A and D are divalent organic structural groups), in which, in addition to the esters formed in the reaction, lower polycondensation products (oligomers), and as a rule also still small amounts of the dicarboxylic or hydroxycarboxylic acids—or of functional derivatives thereof—and of the diols are present.

It is of particular advantage if the dicarboxylic acid-diol precondensate (oligomer) employed in the process according to the invention, obtained by reaction of dicarboxylic acid bis-lower alkyl esters with a diol, is heated in an inert liquid heat transfer medium which—in the technical sense— is free from aromatic structural groups and has a boiling point in the range from 200° to 320° C., preferably from 220° to 300° C., in particular from 240° to 285° C., where the weight ratio of dicarboxylic acid-diol precondensate (oligomer) employed to liquid heat transfer medium is in the range from 20:80 to 80:20, preferably in the range from 30:70 to 70:30, in particular in the range from 50:50 to 70:30, if appropriate in the presence of a dispersion stabilizer and in the presence of known transesterification catalysts, to a temperature such that the lower alkanol liberated during the transesterification distills off. The abovementioned inert liquid heat transfer medium is—in the technical sense—free from aromatic structural groups, i.e. it comprises not more than 2% by weight, preferably not more than 1% by weight, of aromatic constituents. Examples of such heat transfer media are, inter alia, ®Isopar P, ®Isopar V, ®Exxsol D120, ®Exxsol D140 and ®Norpar 15 (from EXXON CHEMICALS). Particularly preferred heat transfer media are aliphatic hydrocarbons which contain no aromatic structural groups.

The reaction mixture is expediently heated in a prior reaction phase to a temperature which is about 5° to 50° C., preferably 10° to 40° C., above the melting point of the dicarboxylic acid bis-lower alkyl ester, but at least about 5° to 50° C., preferably 10° to 40° C., above the boiling point of the alkanol to be distilled off. In this procedure, the same heat transfer medium which is used for the polycondensation according to the invention described above can particularly advantageously be employed for the preparation of the dicarboxylic acid-diol precondensate (oligomer). The process according to the invention can then be carried out starting from the monomeric starting materials, the dicarboxylic acid bis-lower alkyl ester and the diol, in a "one-pot process" which proceeds in two sections.

In a specific embodiment of the process according to the invention, a dicarboxylic acid-diol precondensate is employed which contains, as the analytical average, based on the sum of all the dicarboxylic acid structural groups=100 mol %, 70 to 100 mol % of structural groups of the formula —CO—A$^1$—CO—(I) 0 to 30 mol % of structural groups of the formula —CO—A$^2$—CO—(II) 0 to 50 mol % of structural groups of the formula —O—A$^3$—CO—(III) and diol structural groups of the formulae —O—D$^1$—O— (IV) and —O—D$^2$—O—(V), in which A$^1$ is 1,4-phenylene-, 2,6-naphthylene- or 4,4'-biphenylene radicals, which can be present individually or in any desired mixture, A$^2$ is aromatic radicals other than A$^1$ or araliphatic radicals having 5 to 16, preferably 6 to 12, carbon atoms or cyclic or acyclic aliphatic radicals having 2 to 10 carbon atoms, preferably 4 to 8 carbon atoms, A$^3$ is aromatic radicals having 5 to 12, preferably 6 to 10, carbon atoms, D$^1$ is alkylene or polymethylene groups having 2 to 4 carbon atoms or cycloalkane or dimethylenecycloalkane groups having 6 to 10 carbon atoms and D$^2$ is alkylene or polymethylene groups having 3 to 4 carbon atoms or cycloalkane or dimethylenecycloalkane groups having 6 to 10 carbon atoms other than D$^1$, or straight-chain or branched alkanediyl groups having 4 to 16, preferably 4 to 8, carbon atoms or radicals of the formula —(C$_2$H$_4$—O)$_m$—C$_2$H$_4$—, in which m is an integer from 1 to 40, where m is preferably 1 or 2 for contents of up to 20 mol % and groups where m=10 to 40 are preferably present only in contents of less than 5 mol %.

The aromatic radicals A$^2$ and A$^3$ in their turn can also carry one or two substituents. Preferably, substituted radicals A$^2$ and A$^3$ carry only one substituent. Particularly suitable substituents are alkyl having 1 to 4 carbon atoms, alkoxy having 1 to 4 carbon atoms, chlorine and the sulfonic acid group.

In accordance with the above statement, the dicarboxylic acid-diol precondensate employed as the starting material for the specific embodiment of the process according to the invention is a reaction product of one or more, preferably up to three, in particular one or two, dicarboxylic acids of the formula HOOC—A$^1$—COOH and, if appropriate, one or more dicarboxylic acids of the formula HOOC—A$^2$—COOH or hydroxycarboxylic acids of the formula HO—A$^3$—COOH, or functional derivatives of such di- or hydroxycarboxylic acids, with one or more diols of the formula HO—D$^1$—OH, and if appropriate one or more diols of the formula HO—D$^2$—OH, in which, in addition to the esters formed from the starting materials, lower polycondensation products (oligomers) and as a rule also still small amounts of the starting materials are also present.

The dicarboxylic acid-diol precondensate (also called oligomer synonymously in the following text) employed as the starting material and having the composition stated can be obtained by first transesterifying the required dicarboxylic acids or functional derivatives thereof, for example lower alkyl esters thereof in the required ratios of amounts, with the required diols in the required ratios of amounts, a certain amount of condensation to give oligomer mixtures as a rule already starting. If appropriate, condensation can then be carried out further up to a desired higher degree of oligomerization. The reaction of the dicarboxylic acids with the diols can be carried out without addition of a catalyst, if functional acid derivatives are employed known suitable catalysts are expediently added, and if lower alkyl esters are employed, for example, transesterification catalysts, such as manganese salts, are added.

However, the dicarboxylic acid-diol precondensates can preferably be obtained in the desired composition by a procedure in which precondensates of the individual dicarboxylic acids envisaged for the cocondensation with the desired diols are mixed with one another in the desired mixing ratio. This method has the considerable technical advantage that the transesterification and, if appropriate, oligomerization have to be carried out only with few individual compounds in fixed equimolar ratios. Any oligomer composition desired for the process according to the invention can then easily be prepared by a simple mixing operation from the individual oligomers prepared "in stock".

For the preparation of a copolyester of a given composition by the process according to the invention, it is important to establish the composition of the precondensate such that the mol % contents stated above for $A^1$, $A^2$ and $A^3$ are adhered to. The polyester prepared according to the invention then has virtually the same mol % contents of the structural groups $A^1$, $A^2$ and $A^3$ as the precondensate employed.

The contents of the diols in the precondensate as a rule differ from the content of the structural groups IV and V in the finished polyester. If a polyester which has a given composition in respect of the diol structural groups is to be prepared by the process according to the invention, the diol contents which must be present in the precondensate in order to obtain the desired end product are to be determined by a few preliminary experiments. If the rate of reaction parameters of the individual diols and the compositions of their azeotropes with the heat transfer medium at the reaction temperature are known, the diol contents necessary in the precondensate can also be calculated for a desired polyester composition. Since the determination of these parameters is indeed routine, but nevertheless labor-intensive, routinely carrying out preliminary experiments leads to the goal faster in practice.

Precise knowledge of the individual substances contained in the precondensate is not necessary for carrying out the process according to the invention.

As already stated above, a particular advantage of the process according to the invention is that many copolyesters which cannot be obtained in a solid, non-tacky form by conventional methods can also be prepared in a very good yield and with a high average molecular weight with the aid of this process. The process shows its particular advantages, for example, if a dicarboxylic acid-diol precondensate is employed in which $A^1$, based on the total amount of structural groups $A^1$, comprises to the extent of 8 to 92 mol % 1,4-phenylene radicals, and to the extent of 8 to 92 mol % 2,6-naphthylene radicals, preferably to the extent of 16 to 84 mol % 1,4-phenylene radicals, and to the extent of 16 to 84 mol % 2,6-naphthylene radicals, in particular to the extent of 30 to 70 mol % 1,4-phenylene radicals, and to the extent of 30 to 70 mol % 2,6-naphthylene radicals.

Another particular advantage of the process according to the invention is that it allows the preparation of particularly high molecular weight polyesters and copolyesters under surprisingly mild reaction conditions and in a relatively short reaction time, it also being possible for a significantly narrower molecular weight distribution to be achieved in many cases.

This applies both to the uniform or only slightly modified polyesters in which $A^1$ exclusively is 1,4-phenylene radicals or 2,6-naphthylene radicals or 4,4'-biphenyl radicals, and, in particular, also to copolyesters which are obtained if a dicarboxylic acid-diol precondensate is employed in which $A^1$, based on the total amount of structural groups $A^1$, comprises to the extent of 8 to 92 mol %, preferably to the extent of 16 to 84 mol-%, in particular to the extent of 30 to 70 mol %, 1,4-phenylene radicals, and to the extent of 8 to 92 mol %, preferably to the extent of 16 to 84 mol %, in particular to the extent of 30 to 70 mol %, 4,4'-biphenylene radicals.

Corresponding advantages also result if a dicarboxylic acid-diol precondensate is employed in which $A^1$, based on the total amount of structural groups $A^1$, comprises to the extent of 8 to 92 mol %, preferably to the extent of 16 to 84 mol %, in particular to the extent of 30 to 70 mol %, 2,6-naphthylene radicals, and to the extent of 8 to 92 mol %, preferably to the extent of 16 to 84 mol %, in particular to the extent of 30 to 70 mol %, 4,4'-biphenylene radicals.

A preferred process according to the invention is also that where a dicarboxylic acid-diol precondensate is employed in which $A^1$ contains 1,4-phenylene and 2,6-naphthylene and 4,4'-biphenylene radicals where, based on the total amount of structural groups $A^1$, the sum of the 1,4-phenylene and 2,6-naphthylene radicals of the sum of the 1,4-phenylene and 4,4'-biphenylene radicals or the sum of the 2,6-naphthylene and 4,4'-biphenylene radicals is 8 to 92 mol %, preferably to the extent of 16 to 84 mol %, in particular to the extent of 30 to 70 mol %.

The process according to the invention is furthermore preferable for the polycondensation of those dicarboxylic acid-diol precondensates in which no structural groups of the formula III are present, or in which $D^1$ is ethylene, tetramethylene or 1,4-dimethylene-cyclohexane, in particular ethylene or tetramethylene.

Amphiphilic copolymers or surface-modified laminar silicates are particularly suitable dispersion stabilizers for the process according to the invention.

Amphiphilic copolymers or modified inorganic compounds are preferred as dispersion stabilizers. These are, for example, laminar silicates surface-modified with trialkylammonium salts, preferably bentonite surface-modified with trialkylammonium salts, or amphiphilic copolymers of a polar polymer unit, for example polyvinylpyrrolidone, and a non-polar polymer unit, for example long-chain alphaolefins. The dispersion stabilizers mentioned above are employed in amounts of between 0.01 and 5% by weight, preferably between 0.1 and 4% by weight.

In a preferred practical embodiment of the process according to the invention, the starting substances, oligomers, polycondensation catalysts and, if appropriate, further additives are first mixed with the liquid heat transfer medium, the mixture is heated to elevated temperature, expediently between 80°, preferably 130°, in particular 160° C. and the polycondensation temperature, and the dispersion stabilizer or the dispersion stabilizer mixture, an amphiphilic copolymer being employed in particular here, is then stirred in.

Cocondensible modifying agents in the context of this description of the invention are compounds which contain at least two functional groups capable of ester formation, so that they can be incorporated into a polyester chain in the course of the polycondensation reaction, and which impart certain desired properties to the polyester prepared. Cocondensible modifying agents can be present in the copolycondensation batch in an amount of up to 15% by weight, preferably up to 10% by weight. Characteristic examples of such cocondensible modifying agents are phosphinic acid derivatives of the formulae

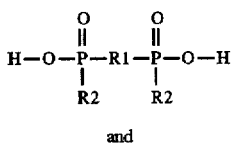

and

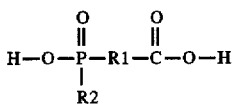

in which R1 is alkylene or polymethylene having 2 to 6 carbon atoms or phenyl, preferably ethylene, and R2 is alkyl having 1 to 6 carbon atoms, aryl or aralkyl, preferably methyl, ethyl, phenyl or o-, m- or p-methylphenyl, in particular methyl, or functional derivatives thereof, such as, for example,

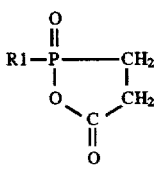

(®PHOSPHOLAN from Hoechst AG).

Structural groups of the formulae VIII and IX

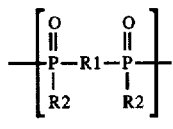

and

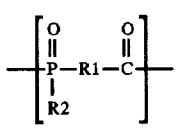

are introduced into the copolyester chain by cocondensation of these compounds. The copolyesters modified in this manner have a considerably lower flammability than the corresponding non-modified copolyesters.

As already stated above, the polycondensation is preferably carried out in the boiling reaction mixture, so that the polycondensation product formed is advantageously present in a flowable or molten form. Preferably, heat is supplied to the reaction mixture in an amount such that it boils quite vigorously, i.e. significant reflux of the heat transfer medium is to be observed. The degree of reflux can easily be adjusted by regulating the heating temperature.

Low molecular weight reaction products are removed in circulation from the polycondensation reaction during this procedure.

It is of particular advantage here that the low molecular weight reaction products dissolve in only a very small amount in the heat transfer medium to be employed according to the invention. They therefore precipitate out of the distillate, form their own phase, usually of higher specific gravity, and can therefore easily be separated off from the heat transfer medium. So-called "water separators" are used in practice for such separations of immiscible liquids which result during azeotropic distillations. These devices are as a rule cylindrical vessels having an upper and a lower discharge and, if appropriate, a pressure compensation opening also above the upper discharge. The lower discharge allows the removal of the phase of the azeotrope of higher specific gravity, and the upper discharge allows the removal of the phase of lower specific gravity. The discharges of the water separator are installed and connected to tubes such that the heat transfer medium, which also acts simultaneously as the entraining agent of the azeotrope during the distillation, is recycled into the reactor and the other phase of the azeotrope can be removed at intervals of time or continuously.

The present invention furthermore relates to the polyesters and copolyesters prepared by the process according to the invention.

Compared with conventionally prepared products, they are distinguished by a particularly high purity, in particular a very low acetaldehyde content of less than 20 ppm, preferably less than 10 ppm, in particular less than 5 ppm, coupled with very high average molecular weights ($M_w$), and often also a narrower molecular weight distribution. The abovementioned average molecular weight (stated in g/mol and measured by means of GPC.) in the case of PET and PET/PEN copolyesters is above 100000, preferably above 150000, in particular above 200000. In the case of PEN, PENBB, PEBB, PETBB and PENTBB copolyesters, the average molecular weight is above 40000, preferably above 60000, in particular above 80000. The term PENTBB is understood as meaning a copolyester [poly="P"] containing 2,6-naphthalenedicarboxylic acid units ["N"], 4,4'-biphenylenedicarboxylic acid units ["BB"], terephthalic acid units ["T"] and ethylene glycol units ["E"].

A group of preferred polyesters according to the invention is built up from, based on the total of all the structural groups, 35 to 50 mol % of structural groups of the formula —CO—$A^1$—CO—(I) 0 to 15 mol % of structural groups of the formula —CO—$A^2$—CO—(II) 35 to 50 mol % of structural groups of the formula —O—$D^1$—O—(IV) 0 to 15 mol % of structural groups of the formula —O—$D^2$—O— (V) and 0 to 25 mol % of structural groups of the formula —O—$A^3$—CO—(III) and, if appropriate, up to 15% by weight of structural groups derived from cocondensible modifying agents, in which $A^1$ is 1,4-phenylene-, 2,6-naphthylene- or 4,4'-biphenylene radicals, where $A^1$ is composed of at least two of these types of structural groups and each of the structural groups contained in $A^1$ is present to the extent of at least 8 mol %, based on the total amount of structural groups $A^1$, $A^2$ is aromatic radicals other than $A^1$ or araliphatic radicals having 5 to 16, preferably 6 to 12, carbon atoms or cyclic or acyclic aliphatic radicals having 2 to 10 carbon atoms, preferably 4 to 8 carbon atoms, $A^3$ is aromatic radicals having 5 to 12, preferably 6 to 10, carbon atoms, $D^1$ is alkylene- or polymethylene groups having 2 to 4 carbon atoms or cycloalkane or dimethylenecycloalkane groups having 6 to 10 carbon atoms and $D^2$ is alkylene or polymethylene groups having 3 to 4 carbon atoms or cycloalkane or dimethylenecycloalkane groups having 6 to 10 carbon atoms other than $D^1$, or straight-chain or branched alkanediyl groups having 4 to 16, preferably 4 to 8, carbon atoms or radicals of the formula —($C_2H_4$—O)$_m$—$C_2H_4$—, in which m is an integer from 1 to 40, where m is preferably 1 or 2 for contents of up to 20 mol % and groups where m=10 to 40 are preferably present only in contents of less than 5 mol %.

Those polyesters and copolyesters according to the invention which cannot be prepared or can be prepared only in a deficient quality by conventional methods, and on the other hand can be prepared in a very good quality by the process according to the invention are particularly preferred.

One group of preferred polyesters according to the invention which can so far be prepared in a good quality only by the process according to the invention are polyesters of structural groups I and IV and, if appropriate, structural groups II, III and V, in which $A^1$, based on the total amount of structural groups $A^1$, comprises to the extent of 8 to 92 mol % 1,4-phenylene radicals, and to the extent of 8 to 92 mol % 2,6-naphthylene radicals, preferably to the extent of 16 to 84 mol % 1,4-phenylene radicals, and to the extent of 16 to 84 mol % 2,6-naphthylene radicals, in particular to the extent of 30 to 70 mol % 1,4-phenylene radicals, and to the extent of 30 to 70 mol % 2,6-naphthylene radicals.

Particularly high molecular weight polyesters and copolyesters according to the invention having a significantly narrower molecular weight distribution and a high purity are those in which $A^1$ comprises exclusively 1,4-phenylene radicals or 2,6-naphthylene radicals or 4,4'-biphenylene radicals, and in particular copolyesters in which $A^1$, based on the total amount of structural groups $A^1$, comprises to the extent of 8 to 92 mol %, preferably to the extent of 16 to 84 mol %, in particular to the extent of 30 to 70 mol %, 1,4-phenylene radicals, and to the extent of 8 to 92 mol %, preferably to the extent of 16 to 84 mol %, in particular to the extent of 30 to 70 mol %, 4,4'-biphenylene radicals.

Other preferred polyesters are those in which $A^1$, based on the total amount of structural groups $A^1$, comprises to the extent of 8 to 92 mol %, preferably to the extent of 16 to 84 mol %, in particular to the extent of 30 to 70 mol %, 2,6-naphthylene radicals, and to the extent of 8 to 92 mol %, preferably to the extent of 16 to 84 mol %, in particular to the extent of 30 to 70 mol %, 4,4'-biphenylene radicals, and those in which $A^1$ comprises 1,4-phenylene and 2,6-naphthylene and 4,4'-biphenylene radicals, where, based on the total amount of structural groups $A^1$, the sum of the 1,4-phenylene and 2,6-naphthylene radicals or the sum of the 1,4-phenylene and 4,4'-biphenylene radicals or the sum of the 2,6-naphthylene and 4,4'-biphenylene radicals is 8 to 92 mol %, preferably to the extent of 16 to 84 mol %, in particular to the extent of 30 to 70 mol %.

Copolyesters according to the invention which are furthermore preferred are those in which no structural groups of the formula III are present, or in which $D^1$ is ethylene, tetramethylene or 1,4-dimethylenecyclohexane, in particular ethylene or tetramethylene.

The polyesters according to the invention are excellently suitable for coating purposes, for example for powder coating by the dipping process or by fluidized bed coating, and generally for powder applications, such as, for example, as pulverulent hot-melt adhesives, or as binders for compression molding compositions, or for the production of extruded shaped articles, such as, for example, bottles, films or filaments and fibers for the industrial or textile field of use.

The following embodiment examples illustrate the implementation of the present invention.

EXAMPLE 1

In a reactor provided with feeds, a stirrer, a distillation attachment with a water separator and a solvent reflux, 7 kg of a mixture of aliphatic hydrocarbons having a boiling range which starts at 275° C. (®ISOPAR V) are stirred vigorously with 120 g of surface-modified bentonire (®BENTONE 38) and 40 g of propylene carbonate such that high shearing forces occur in the mass. This is effected, for example, by using an Ultra-Turrax. 3 kg of a 2,6-naphthalene-dicarboxylic acid/ethylene glycol precondensate having an average degree of transesterification of 90–100% and 1.2 g of antimony trioxide are then admixed, while continuing to stir vigorously. Thereafter, the mixture is heated to vigorous boiling, a uniform distribution of the constituents of the mixture in the hydrocarbon mixture being obtained. The mixture is boiled for 6 hours, while continuing to stir under reflux, and the glycol separated off in the water separator is drained off from the resulting distillate from time to time. The supernatant hydrocarbon mixture in the separator is allowed to run back into the reactor. The internal temperature of the reactor is established at 280° C. during this procedure. Samples of the reaction mixture were taken at intervals of 1.5 hours each, and the average particle size of the polyester was determined. The following values resulted:

| Reaction time (hours): | 1.5 | 3.0 | 4.5 | 6.0 |
| --- | --- | --- | --- | --- |
| Particle size (μm): | 16 | 16 | 13 | 17 |

At the end of the reaction time, the batch was cooled and the resulting polyester was separated off from the hydrocarbon mixture by filtration, washed, dried and weighed. The yield was 2979 g, corresponding to 99.3% of theory.

EXAMPLE 2a (Comparison with Example 1)

For comparison, Example 1 was repeated, with the difference that instead of the hydrocarbon mixture employed therein as the heat transfer medium, a mixture of aliphatics having a boiling range of about 325° to 500° C. (®THERMIA E) was employed. The reaction temperature was established at about 280° C. as in Example 1. During the reaction, the glycol liberated in the condensation reaction was distilled off from the batch, but the heat transfer medium did not boil. As in Example 1, the polycondensation was interrupted after 6 hours and the particle size was determined. It was 52 μm. After working up as described above, 2970 g of polyester were obtained (yield about 99% of theory).

EXAMPLE 2b (Comparison with Example 1)

As a further comparison with the product of Example 1, polyethylenenaphthalate was prepared by a melt condensation in a conventional manner. For this, 1000 g of dimethyl 2,6-naphthalenedicarboxylate were first transesterified with 500 ml of ethylene glycol in the presence of 300 mg of manganese(II) acetate (with 4 mol of water of crystallization) at 200° C. to give naphthalenedicarboxylic acid diglycol ester and oligomers. When the splitting off of methanol had ended, 410 mg of methyl phosphate and 390 mg of antimony trioxide were added to the batch and the melt was subjected to polycondensation at 300° C. under a pressure of 0.1 mbar for 3 hours. The properties of the resulting polyester are to be found in the following tables.

EXAMPLE 3

In a reactor fitted with feeds, a stirrer, a distillation attachment with a water separator and a solvent reflux, 7 kg of a mixture of aliphatic hydrocarbons having a boiling range which starts at 240° C. (®Isopar P) are mixed with 3 kg of a dicarboxylic acid-diol precondensate comprising a mixture of 20% by weight of 2,6-naphthalenedicarboxylic acid/ethylene glycol precondensate and 80% by weight of terephthalic acid/ethylene glycol precondensate, while stirring vigorously. The mixture is heated to an internal temperature of about 260° C. and 140 g of a polyvinylpyrrolidone/polyolefin copolymer (®ANTARON V 220) are then added. A homogeneous milky emulsion of the polyester precondensate in the hydrocarbon mixture is obtained. The mixture is heated to vigorous boiling, while continuing to stir, and the glycol separated off in the water separator is drained off from the resulting distillate from time to time. The supernatant hydrocarbon mixture is allowed to run back into the reactor. The internal temperature of the reactor is established at about 260° C. during this procedure; it was maintained over a period of 6 hours.

At the end of the reaction time, the batch was cooled and the resulting polyester was filtered off from the hydrocarbon mixture, washed with petroleum ether, dried and weighed. The yield was 2960 g, corresponding to 98.6% of theory.

Practically the same result is arrived at if, instead of 7 kg of the heat transfer medium, only 3 kg, 2 kg or 1.3 kg of the heat transfer medium are employed.

EXAMPLES 4 and 5

The batch from Example 3 was repeated, with the difference that a dicarboxylic acid/diol precondensate comprising a mixture of 50% by weight of 2,6-naphthalenedicarboxylic acid/ethylene glycol precondensate and 50% by weight of terephthalic acid/ethylene glycol precondensate or of 80% by weight of 2,6-naphthalenedicarboxylic acid/ethylene glycol precondensate and 20% by weight of terephthalic acid/ethylene glycol precondensate was employed. The yields were 99.1 and 95.8% of theory respectively. The composition of the resulting polyester was investigated by $^1$H-NMR spectroscopy. The following results were obtained:

Ratio of the 2,6-naphthalenedicarboxylic acid/terephthalic acid structural groups in the polyester in mol %:

| Theoretical: | 17.27/82.72 | 45.52/54.48 | 76.97/23.03 |
|---|---|---|---|
| According to NMR: | 13.5/86.5 | 42.2/57.8 | 78.5/21.5 |

EXAMPLE 6

In a reactor provided with feeds, a stirrer, a distillation attachment with a water separator and a solvent reflux, 7 kg of a mixture of aliphatic hydrocarbons having a boiling range which starts at 240° C. (®ISOPAR P) are stirred vigorously with 210 g of surface-modified bentonite (®BENTONE 38) and 40 g of propylene carbonate such that high shearing forces occur in the mass. 3 kg of a terephthalic acid/ethylene glycol precondensate having an average degree of transesterification of 90–100% and 1.2 g of antimony trioxide are then admixed, while continuing to stir vigorously. Thereafter, the mixture is heated to vigorous boiling, a uniform distribution of the constituents of the mixture in the hydrocarbon mixture being obtained. The mixture is boiled for 6 hours, while continuing to stir under reflux (the internal temperature is 260° C.), and the glycol separated off in the water separator is drained off from the resulting distillate from time to time. The supernatant hydrocarbon mixture in the separator is allowed to run back into the reactor.

Samples of the reaction mixture were taken at intervals of 1.5 hours each, and the average particle size of the polyester was determined. The following values resulted:

| Reaction time (hours): | 1.5 | 3.0 | 4.5 | 6.0 |
|---|---|---|---|---|
| Particle size (µm): | 92 | 105 | 125 | 110 |

At the end of the reaction time, the batch was cooled and the resulting polyester was separated off from the hydrocarbon mixture by filtration, washed, dried and weighed. The yield was 99.1% of theory. The properties of the product are to be found in the following table.

EXAMPLES 6b, 6c and 6d

Instead of ®BENTONE, ®ANTARON V220 was employed in an amount of 1%, based on the amount of the precondensate. Mixtures of ®ISOPAR P and ®ISOPAR V in weight ratios of 20:80, 50:50 and 10:90 were used as the heat transfer medium. The reaction temperature and reaction time were established as in Example 6. Different molecular weights were achieved, depending on the composition of the heat transfer mixture. These examples illustrate the influence of the reflux ratio of the heat transfer medium on the molecular weight.

EXAMPLE 7

(Comparison to Example 6)

Example 6 was reworked exactly, with the difference that instead of the heat transfer medium employed therein, 7 kg of a heat transfer medium having a boiling range from 355° to 530° C. (®Santotherm 66) was employed. The reaction temperature was established at 260° C., as in Example 6, and maintained for 6 hours. The mixture did not boil under these conditions. At the end of the reaction time, the batch was cooled and the resulting polyester was separated off from the hydrocarbon mixture by filtration, washed, dried and weighed. The yield was only 82.3% of theory. The properties of the product are to be found in the following table.

EXAMPLE 8

(Comparison to Example 6)

As a further comparison to the product of Example 1, polyethylene terephthalate was prepared by a melt condensation in the conventional manner. For this, 1000 g of dimethyl terephthalate were first transesterified with 600 ml of ethylene glycol in the presence of 330 mg of manganese (II) acetate (with 4 mol of water of crystallization) at 200° C. to give terephthalic acid diglycol ester and oligomers. When the splitting off of methanol was ended, 410 mg of methyl phosphate and 390 mg of antimony trioxide were added to the batch and the molten mixture was subjected to polycondensation at 280° C. under a pressure of 0.1 mbar for 3 hours. The properties of the resulting polyester are to be found in the following tables.

EXAMPLE 9

In a reactor having feeds, a stirrer, a distillation attachment with a phase separator and a solvent reflux, 33 kg of a terephthalic acid/ethylene glycol precondensate are weighed with 29 kg of an aliphatic hydrocarbon mixture having a boiling range which starts at 240° C. (Isopar P/Isopar V in a volume ratio of 75:25), 285 g of Antaron V 220 and 11.1 g of antimony trioxide, and the mixture is heated from room temperature to a temperature of 260°–270° C. in the course of 2 hours, so that the mixture boils vigorously. The mixture is kept under reflux for 6 hours (internal temperature 266° C.) and the glycol discharged from the distillate is drained off via the phase separator.

The following parameters of the polyesters obtained according to Examples 1 to 9 were determined:

1) The glass transition temperature $T_g$ and the crystallite melting temperature $T_m$. These parameters were determined by DSC at a heating-up rate of 10° C./minute.
2) The specific viscosity $V_s$. ($V_s=(t/t_0)-1$) This parameter was determined in a solution of 1 g of the polyester in 100 ml of dichloroacetic acid (DCA) at the temperatures [°C.] stated in the table. The dissolving time is 90 minutes. The measurement is made at 25° C.
3) The average molecular weights $M_n$ and $M_w$. These values were determined by gel permeation chromatography (GPC.) with a mixture of hexafluoroisopropanol/chloroform 3:97 (% by volume) as the mobile phase on polystyrene against polyethylene terephthalate standards.
4) The particle sizes (d50 value) were determined by means of a ®MALVERN MASTER-SIZER X by laser light diffraction in n-heptane with the addition of ®Span 80.
5) The free acetaldehyde content was determined by heating 1 g of polyester powder at 140° C. in a closed vessel for 20 minutes and then carrying out a gas chromatography vapor space analysis. Helium/acetaldehyde mixtures are used for the calibration.

The measurement results obtained have been stated in the following table. The table also contains the quotient $M_w/M_n=U$, which gives the person skilled in the art an idea of the range of the molecular weight distribution, in the last but one column.

TABLE 1

Composition and process conditions

| Example No. | Precondensate | Heat transfer medium (HT) | Boiling range of the HT [°C.] | Reaction temperature [C.] | Composition [% by weight] |
|---|---|---|---|---|---|
| 1 | PEN | Isopar V | 274–315 | 280 | 100% of PEN |
| 2a | PEN | Thermia E | 325–530 | 280 | 100% of PEN |
| 2b | PEN | (melt) | – | 300 | 100% of PEN |
| 3 | PET/PEN | Isopar P | 240–270 | 260 | 80:20 |
| 4 | PET/PEN | Isopar P | 240–270 | 260 | 50:50 |
| 4b | PET/PEN | (melt) | — | 280 | 50:50 |
| 5 | PET/PEN | Isopar P | 240–270 | 260 | 20:80 |
| 6 | PET | Isopar P | 240–270 | 260 | 100% of PET |
| 6a | PET | Isopar P/Isopar V 20:80 (v) | 260–270 | 262 | 100% of PET |
| 6b | PET | Isopar P/Isopar V 50:50 | 260–270 | 262 | 100% of PET |
| 6c | PET | Isopar P/Isopar V 90:10 | 255–265 | 262 | 100% of PET |
| 7 | PET | Santotherm 66 | 355–530 | 260 | 100% of PET |
| 8 | PET | (melt) | — | 280 | 100% of PET |
| 9 | PET | Isopar P/Isopar V 75:25 | 240–320 | 266 | 100% of PET |

TABLE 2

Properties of the polyester obtained in Examples 1 to 8.

| Example No. | $T_g$ [°C.] | $T_m$ [°C.] | $V_s$ in DCA | $M_n$ | $M_w$ | $U = M_w/M_n$ | Particle size [d50] in [μm] | Acetaldehyde content in [ppm] |
|---|---|---|---|---|---|---|---|---|
| 1 | | | 0.467 [at 80° C.] | 17600 | 45733 | 2.60 | 52 | 0.6 |
| 2a | | | 0.778 [at 80° C.] | 5213 | 25410 | 4.88 | 17 | 1.3 |
| 2b | 125 | 272 | 0.622 [at 80° C.] | 14030 | 34375 | 2.45 | — | |
| 3 | 107.12 | | 1.750 [at 60° C.] | 56628 | 162170 | 2.86 | 253 | |
| 4 | 96.9 | | 1.924 [at 60° C.] | 51143 | 159140 | 3.11 | 203 | |
| | | | | 9435 | 21064 | 2.23 | | |
| 5 | 86.9 | | 1.680 [at 60° C.] | 44747 | 136510 | 3.05 | 225 | |
| 6 | 79 | 243 | 1.890 [at 60° C.] | 36090 | 133010 | 3.69 | see Text | |
| 6a | | | | 14469 | 32225 | 2.23 | | 6.3 |
| 6b | | | | 25560 | 61865 | 2.42 | 80 | 4.8 |
| 6c | | | | 53766 | 217310 | 4.04 | 184 | 3.3 |
| 7 | 66 | 233 | 0.353 [at 60° C.] | 4810 | 15728 | 3.27 | | |
| 8 | 86 | 251 | 0.859 [at 60° C.] | 20242 | 54024 | 2.67 | — | 41.2 |
| 9 | 82 | 251 | — | 39649 | 119050 | 3.0 | — | — |

We claim:

1. A process for the preparation of a polyester or copolyester in powder form, comprising:
polycondensing, in a reaction mixture, reactants comprising an oligomeric dicarboxylic acid-diol precondensate at elevated temperature in a liquid heat transfer medium in the presence of a catalytic amount of a polycondensation catalyst, wherein said liquid heat transfer medium is inert toward the reactants and essentially free of aromatic structural groups and has a boiling point in the range from 200° to 320° C., and wherein the weight ratio of dicarboxylic acid-diol precondensate to liquid heat transfer medium is in the range from 20:80 to 80:20, and wherein the polycondensing step is carried out in the reaction mixture at 200° to 320° C., in the presence of a dispersion stabilizer.

2. The process as claimed in claim 1, wherein the liquid heat transfer medium has a boiling point in the range from 220° to 300° C., and wherein a cocondensable modifying agent is optionally present during said polycondensing step.

3. The process as claimed in claim 1, wherein the liquid heat transfer medium has a boiling point in the range from 240° to 285° C.

4. The process as claimed in claim 1, wherein the weight ratio of dicarboxylic acid-diol precondensate (oligomer) employed to liquid heat transfer medium is in the range from 30:70 to 70:30.

5. The process as claimed in claim 1, wherein the weight ratio of dicarboxylic acid-diol precondensate (oligomer) employed to liquid heat transfer medium is in the range from 50:50 to 70:30.

6. The process as claimed in claim 1, wherein said dicarboxylic acid-diol precondensate is obtained by reaction of dicarboxylic acid bis-lower alkyl ester with a diol in the presence of a transesterification catalyst, optionally in the presence of a dispersion stabilizer, with liberation of an alkanol, and at a temperature sufficient to distill off said alkanol.

7. The process as claimed in claim 1, wherein a dicarboxylic acid-diol precondensate is employed which contains, as the analytical average, based on the sum of all the dicarboxylic acid structural groups=100 mol %, 70 to 100 mol % of structural groups of the formula —CO—$A^1$—CO—(I) 0 to 30 mol % of structural groups of the formula —CO—$A^2$—CO—(II) 0 to 50 mol % of structural groups of the formula —O—$A^3$—CO—(III) and diol structural groups of the formulae —O—$D^1$—O—(IV) and —O—$D^2$—O—(V), in which $A^1$ is 1,4-phenylene-, 2,6-naphthylene- or 4,4'-biphenylene radicals, which can be present individually or in any desired mixture, $A^2$ is aromatic radicals other than $A^1$ or araliphatic radicals having 5 to 16 carbon atoms or cyclic or acyclic aliphatic radicals having 2 to 10 carbon atoms, $A^3$ is aromatic radicals having 5 to 12 carbon atoms, $D^1$ is alkylene or polymethylene groups having 2 to 4 carbon atoms or cycloalkane or dimethylenecycloalkane groups having 6 to 10 carbon atoms and $D^2$ is alkylene or polymethylene groups having 3 to 4 carbon atoms or cycloalkane or dimethylenecycloalkane groups having 6 to 10 carbon atoms other than $D^1$, or straight-chain or branched alkanediyl groups having 4 to 16 carbon atoms or radicals of the formula —($C_2H_4$—O)$_m$—$C_2H_4$—, in which m is an integer from 1 to 40.

8. The process as claimed in claim 7, wherein a dicarboxylic acid-diol precondensate in which $A^1$, based on the total amount of structural groups $A^1$, comprises to the extent of 8 to 92 mol % 1,4-phenylene radicals, and to the extent of 8 to 92 mol % 2,6-naphthylene radicals, is employed.

9. The process as claimed in claim 7, wherein a dicarboxylic acid-diol precondensate in which $A^1$, based on the total amount of structural groups $A^1$ comprises to the extent of 16 to 84 mol % 1,4-phenylene radicals, and to the extent of 16 to 84 mol % 2,6-naphthylene radicals, is employed.

10. The process as claimed in claim 7, wherein a dicarboxylic acid-diol precondensate in which $A^1$, based on the total amount of structural groups $A^1$, comprises to the extent of 30 to 70 mol % 1,4-phenylene radicals, and to the extent of 30 to 70 mol % 2,6-naphthylene radicals, is employed.

11. The process as claimed in claim 7, wherein a dicarboxylic acid-diol precondensate in which $A^1$, based on the total amount of structural groups $A^1$, comprises to the extent of 8 to 92 mol % 1,4-phenylene radicals, and to the extent of 8 to 92 mol % 4,4'-biphenylene radicals, is employed.

12. The process as claimed in claim 7, wherein a dicarboxylic acid-diol precondensate in which $A^1$, based on the total amount of structural groups $A^1$, comprises to the extent of 8 to 92 mol % 2,6-naphthylene radicals, and to the extent of 8 to 92 mol % 4,4'-biphenylene radicals, is employed.

13. The process as claimed in claim 7, wherein a dicarboxylic acid-diol precondensate in which $A^1$ contains 1,4-phenylene and 2,6-naphthylene and 4,4'-biphenylene radicals where, based on the total amount of structural groups $A^1$, the sum of the 1,4-phenylene and 2,6-naphthylene radicals or the sum of the 1,4-phenylene and 4,4'-biphenylene radicals or the sum of the 2,6-naphthylene and 4,4'-biphenylene radicals is 8 to 92 mol % is employed.

14. The process as claimed in claim 7, wherein a dicarboxylic acid-diol precondensate in which no structural groups of the formula III are present is employed.

15. The process as claimed in claim 7, wherein a dicarboxylic acid-diol precondensate in which $D^1$ is ethylene, tetramethylene or 1,4-dimethylenecyclohexane is employed.

16. The process as claimed in claim 1, wherein a dicarboxylic acid-diol precondensate in which $D^1$ is ethylene or tetramethylene is employed.

17. The process as claimed in claim 7, wherein the dispersion stabilizer is an amphiphilic copolymer or a surface-modified laminar silicate and is employed in an amount of between 0.01 and 5% by weight.

18. The process as claimed in claim 7, wherein the dispersion stabilizer is a laminar silicate surface-modified with trialkylammonium salts.

19. The process as claimed in claim 1, wherein the dispersion stabilizer is a bentonite surface-modified with trialkylammonium salts.

20. The process as claimed in claim 1, wherein the dispersion stabilizer is an amphiphilic copolymer of a polar polymer unit and a non-polar polymer unit.

21. The process as claimed in claim 1, wherein the starting substances, oligomers, polycondensation catalysts and optionally further additives are first mixed with the liquid heat transfer medium, the mixture is heated to an elevated temperature, between 80° C. and the polycondensation temperature and the dispersion stabilizer or the dispersion stabilizer mixture is then stirred in.

22. The process as claimed in claim 21, wherein the starting substances, oligomers, polycondensation catalysts and optionally further additives are first mixed with the liquid heat transfer medium, the mixture is heated to an

19 elevated temperature, between 130° C. and the polycondensation temperature and the dispersion stabilizer or the dispersion stabilizer mixture is then stirred in.

23. The process as claimed in claim 22, wherein the starting substances, oligomers, polycondensation catalysts and optionally further additives are first mixed with the liquid heat transfer medium, the mixture is heated to elevated temperature, expediently between 160° C. and the polycondensation temperature and the dispersion stabilizer or the dispersion stabilizer mixture is then stirred in.

24. The process as claimed in claim 1, wherein the polycondensation is carried out in the boiling reaction mixture.

25. The process as claimed in claim 1, wherein the heat transfer medium is essentially an aliphatic hydrocarbon which contains not more than 2% by weight of aromatic constituents.

26. The process as claimed in claim 1, wherein the heat transfer medium is an aliphatic hydrocarbon.

27. The process as claimed in claim 1, wherein low molecular weight reaction products are removed in circulation from the polycondensation reaction.

28. A polyester or copolyester prepared by the process as claimed in claim 1.

29. A polyester or copolyester as claimed in claim 28, in which said polyester or copolyester contains structural groups of the formula —CO—$A^1$—CO—, and wherein $A^1$ is exclusively 1,4-phenylene radicals or 2,6-naphthalene radicals or 4,4'-biphenyl radicals.

30. A polyester or copolyester which can be prepared by the process as claimed in claim 1, which is built up, based on the total of all the polyester structural groups (I) to (V), from 35 to 50 mol % of structural groups of the formula —CO—A—CO—(I) 0 to 15 mol % of structural groups of the formula —CO—$A^2$—CO—(II) 35 to 50 mol % of structural groups of the formula —O—$D^1$—O—(IV) 0 to 15 mol % of structural groups of the formula —O—$D^2$—O—(V) and 0 to 25 mol % of structural groups of the formula —O—$A^3$—CO—(III) and, optionally, up to 15% by weight of structural groups derived from cocondensible modifying agents, in which $A^1$ is 1,4-phenylene-, 2,6-naphthylene- or 4,4'-biphenylene radicals, where $A^1$ is composed of at least two of these types of structural groups and each of the structural groups contained in $A^1$ is present to the extent of at least 8 mol %, based on the total amount of structural groups $A^1$, $A^2$ is aromatic radicals other than $A^1$ or araliphatic radicals having 5 to 16 carbon atoms or cyclic or acyclic aliphatic radicals having 2 to 10 carbon atoms, $A^3$ is aromatic radicals having 5 to 12 carbon atoms, $D^1$ is alkylene- or polymethylene groups having 2 to 4 carbon atoms or cycloalkane or dimethylenecycloalkane groups having 6 to 10 carbon atoms and $D^2$ is alkylene or polymethylene groups having 3 to 4 carbon atoms or cycloalkane or dimethylenecycloalkane groups having 6 to 10 carbon atoms other than $D^1$, or straight-chain or branched alkanediyl groups having 4 to 16 carbon atoms or radicals of the formula —($C_2H_4$—O)$_m$—$C_2H_4$—, in which m is an integer from 1 to 40.

31. A polyester or copolyester as claimed in claim 30, which is built up from structural groups I and IV and, optionally, structural groups II, III and V, and in which $A^1$, based on the total amount of structural groups $A^1$, comprises to the extent of 8 to 92 mol % 1,4-phenylene radicals, and to the extent of 8 to 92 mol % 2,6-naphthylene radicals.

20

32. A polyester or copolyester as claimed in claim 30, which is built up from structural groups I and IV and, optionally, structural groups II, III and V, and in which $A^1$, based on the total amount of structural groups $A^1$, comprises to the extent of 16 to 84 mol % 1,4-phenylene radicals and to the extent of 16 to 84 mol % 2,6-naphthylene radicals.

33. A polyester or copolyester as claimed in claim 30, which is built up from structural groups I and IV and, optionally, structural groups II, III and V, and in which $A^1$, based on the total amount of structural groups $A^1$, comprises to the extent of 30 to 70 mol % 1,4-phenylene radicals and to the extent of 30 to 70 mol % 2,6-naphthylene radicals.

34. A polyester or copolyester as claimed in claim 30, which is built up from structural groups I and IV and, optionally, structural groups II, III and V, and in which $A^1$, based on the total amount of structural groups $A^1$, comprises to the extent of 8 to 92 mol % 1,4-phenylene radicals, and to the extent of 8 to 92 mol % 4,4'-biphenylene radicals.

35. A polyester or copolyester as claimed in claim 30, which is built up from structural groups I and IV and, optionally, structural groups II, III and V, and in which $A^1$, based on the total amount of structural groups $A^1$, comprises to the extent of 8 to 92 mol % 2,6-naphthylene radicals and to the extent of 8 to 92 mol % 4,4'-biphenylene radicals.

36. A polyester or copolyester as claimed in claim 30, which is built up from structural groups I and IV and, optionally, structural groups II, III and V, and in which $A^1$ contains 1,4-phenylene and 2,6-naphthylene and 4,4'-biphenylene radicals, where, based on the total amount of structural groups $A^1$, the sum of the 1,4-phenylene and 2,6-naphthylene radicals or the sum of the 1,4-phenylene and 4,4'-biphenylene radicals or the sum of the 2,6-naphthylene and 4,4'-biphenylene radicals is 8 to 92 mol %.

37. A polyester or copolyester as claimed in claim 30, in which no structural groups of the formula III are present.

38. A polyester or copolyester as claimed in claim 30, which is built up from structural groups I and IV and, optionally, structural groups II, III and V, and in which $D^1$ is ethylene, tetramethylene or 1,4-dimethylene-cyclohexane.

39. A method for powder coating comprising the step of forming the coating from the polyester or copolyester of claim 28.

40. A pulverulent hot-melt adhesive or binder for compression molding compositions comprising the polyester or copolyester of claim 28.

41. An extruded article prepared from the polyester or copolyester of claim 28.

42. The process as claimed in claim 7, wherein, when $D^2$ groups are a radical of the formula —($C_2H_4$—O)$_m$—$C_2H_4$—, m is 1 or 2 for amounts of up to 20 mol % of said groups, and when m is 10 to 40, said groups are present only in amounts less than 5 mol %.

43. The process as claimed in claim 30, wherein, when $D^2$ groups are a radical of the formula —($C_2H_4$—O)$_m$—$C_2H_4$—, is 1 or 2 for amounts of up to 20 mol % of said groups, and when m is 10 to 40, said groups are present only in amounts less than 5 mol %.

44. A process for the preparation of a polyester or copolyester in powder form, comprising:

polycondensing, in a reaction mixture which is essentially free of aromatic constituents, reactants comprising an oligomeric dicarboxylic acid-diol precondensate at elevated temperature in a liquid heat transfer medium in the presence of a catalytic amount of a polycondensation catalyst, wherein said liquid heat transfer medium is inert toward the reactants, is essentially free of aromatic structural groups and water, comprises an aliphatic hydrocarbon and has a boiling point in the range from 200° to 320° C., and wherein the weight ratio of dicarboxylic acid-diol precondensate to liquid heat transfer medium is in the range from 20:80 to 80:20, and wherein the polycondensing step is carded out in the reaction mixture at 200° to 320° C., in the presence of 0.01 to 5% by weight of an amphiphilic copolymer or surface-modified laminar silicate dispersion stabilizer.

* * * * *